(12) United States Patent
Choi et al.

(10) Patent No.: US 11,264,178 B2
(45) Date of Patent: Mar. 1, 2022

(54) ELECTRONIC COMPONENT

(71) Applicant: SAMSUNG ELECTRO-MECHANICS CO., LTD., Suwon-si (KR)

(72) Inventors: Yu Jin Choi, Suwon-si (KR); Hong Kyu Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 15/931,030

(22) Filed: May 13, 2020

(65) Prior Publication Data
US 2021/0159020 A1 May 27, 2021

(30) Foreign Application Priority Data

Nov. 25, 2019 (KR) .................. 10-2019-0152525

(51) Int. Cl.
H01G 9/012 (2006.01)
H01G 2/06 (2006.01)
H01G 9/08 (2006.01)
H01G 9/048 (2006.01)

(52) U.S. Cl.
CPC ............. H01G 9/012 (2013.01); H01G 2/065 (2013.01); H01G 9/048 (2013.01); H01G 9/08 (2013.01)

(58) Field of Classification Search
CPC .................................................. H01G 9/012
See application file for complete search history.

(56) References Cited

U.S. PATENT DOCUMENTS

| 7,280,343 | B1 | 10/2007 | Zednicek et al. | |
| 2003/0026064 | A1* | 2/2003 | Nakada | H01G 9/042 361/523 |
| 2006/0146481 | A1* | 7/2006 | Naito | H01G 9/10 361/528 |
| 2007/0211414 | A1* | 9/2007 | Pelcak | H01G 9/28 361/541 |
| 2008/0158782 | A1* | 7/2008 | Cheng | H01G 9/15 361/524 |
| 2009/0147448 | A1 | 6/2009 | Matsuoka et al. | |
| 2015/0036265 | A1 | 2/2015 | Shin et al. | |

FOREIGN PATENT DOCUMENTS

| JP | 2008-118137 A | 5/2008 |
| JP | 2012-156568 A | 8/2012 |
| KR | 10-2015-0016699 A | 2/2015 |
| KR | 10-1702398 B1 | 2/2017 |

OTHER PUBLICATIONS

Korean Notice of Allowance dated Feb. 25, 2021 issued in Korean Office Action No. 10-2019-0152525 (with English translation).

* cited by examiner

Primary Examiner — Eric W Thomas
(74) Attorney, Agent, or Firm — Morgan, Lewis & Bockius LLP

(57) ABSTRACT

An electronic component includes: a capacitor array including a plurality of tantalum capacitors arranged linearly; and a fixing member supporting a first surface and both side surfaces of the capacitor array so that the plurality of tantalum capacitors are not separated, wherein an area through which adjacent tantalum capacitors in the capacitor array are in contact with each other is 90% or more of an entire area of a corresponding surface of the adjacent tantalum capacitors.

14 Claims, 3 Drawing Sheets

ELECTRONIC COMPONENT

CROSS-REFERENCE TO RELATED APPLICATION

The present application claims the benefit of priority to Korean Patent Application No. 10-2019-0152525, filed on Nov. 25, 2019 with the Korean Intellectual Property Office, the entire disclosure of which is incorporated herein by reference.

TECHNICAL FIELD

The present disclosure relates to an electronic component.

BACKGROUND

A tantalum (Ta) material is a metal having a high melting point and excellent mechanical or physical characteristics such as ductility and corrosion resistance, and is widely used in fields throughout the electrical, electronic, mechanical, chemical, aerospace, and military industries.

The tantalum material is widely used as an anode material for small capacitors due to its ability to form a stable anode oxidation film, and its use has been rapidly increasing every year due to the rapid development of the IT industry such as electronics and information and communication.

The tantalum capacitor using the tantalum material has a structure using an empty gap formed when sintering and solidifying tantalum powder. A tantalum oxide ($Ta_2O_5$) is formed using an anodic oxidation method on a surface of tantalum, a manganese dioxide ($MnO_2$) layer, which is an electrolyte, is formed thereon, using the tantalum oxide ($Ta_2O_5$) as a dielectric, a carbon layer and a metal layer are formed on the manganese dioxide ($MnO_2$) layer to form a body, and an anode and a cathode are formed on the body and an encapsulation portion to mount a PCB and a encapsulate portion is formed to complete the tantalum capacitor.

The tantalum capacitor is used in passive component-intensive products such as TVs, smartphones, notebook computers, tablet PCs, and automotive electronic components, and recently, the demand for the tantalum capacitors capable of realizing small and high capacity is increasing.

Therefore, in order to realize a high-capacity product, an overall size of the product needs to be increased, but in an actual design, if the product size increases, it is difficult to form a semi-finished device and it is difficult to form a cathode layer uniformly inside a porous product.

SUMMARY

An aspect of the present disclosure is to provide an electronic component having high capacity and low resistance, including a tantalum capacitor, without significantly increasing a total size of a product.

According to an aspect of the present disclosure, an electronic component may include: a capacitor array including a plurality of tantalum capacitors arranged linearly; and a fixing member supporting a first surface and both side surfaces of the capacitor array so that the plurality of tantalum capacitors are not separated. An area through which adjacent tantalum capacitors in the capacitor array are in contact with each other is 90% or more of an entire area of a corresponding surface of the adjacent tantalum capacitors.

According to an aspect of the present disclosure, the fixing member may include: a horizontal portion extending on the first surface of the capacitor array; and first and second vertical portions respectively extending from both ends of the horizontal portion, and disposed on both side surfaces of the capacitor array, respectively.

According to an aspect of the present disclosure, the fixing frame may include a metal.

According to an aspect of the present disclosure, each of the plurality of tantalum capacitors may include: a tantalum body including a tantalum powder, and having a tantalum wire exposed from a first end surface thereof; a encapsulation portion encapsulating the tantalum body such that an end portion of the tantalum wire is exposed to an outside of the encapsulation portion; an anode terminal including an anode mounting portion disposed on a first surface of the encapsulation portion, and an anode connection portion extending from the anode mounting portion onto a first end surface of the encapsulation portion, the anode connection portion being connected to the tantalum wire; a thin plate electrode disposed to be connected to a first surface of the tantalum body facing the first surface of the encapsulation portion, and exposed through a second end surface of the encapsulation portion opposing the first end surface of the encapsulation portion; and a cathode terminal including a cathode mounting portion disposed to be spaced apart from the anode mounting portion on the first surface of the encapsulation portion, and a cathode connection portion extending from the cathode mounting portion onto the second end surface of the encapsulation portion, the cathode connection portion being connected to the thin plate electrode.

According to an aspect of the present disclosure, the electronic component may further include an insulating member disposed in the encapsulation portion and the anode mounting portion, and disposed between the thin plate electrode and the cathode mounting portion.

According to an aspect of the present disclosure, a first conductive adhesive layer disposed between the tantalum body and the thin plate electrode may be further included.

According to an aspect of the present disclosure, the first conductive adhesive layer may include an epoxy-based thermosetting resin and a conductive metal powder.

According to an aspect of the present disclosure, a second conductive adhesive layer disposed between the tantalum body and the cathode connection portion of the cathode terminal may be further included.

According to an aspect of the present disclosure, the second conductive adhesive layer may include an epoxy-based thermosetting resin and a conductive metal powder.

According to an aspect of the present disclosure, the thin plate electrode may be spaced apart from both side surfaces of the encapsulation portion opposing each other and connecting the first and second end surfaces of the encapsulation portion to each other.

According to another aspect of the present disclosure, an electronic component may include: a capacitor array including a plurality of tantalum capacitors arranged linearly; and a fixing member disposed on a first surface of the capacitor array and extending in a first direction substantially parallel with a stacking direction of the plurality of tantalum capacitors. The fixing member may further extend onto at least portions of both side surfaces of the capacitor array, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
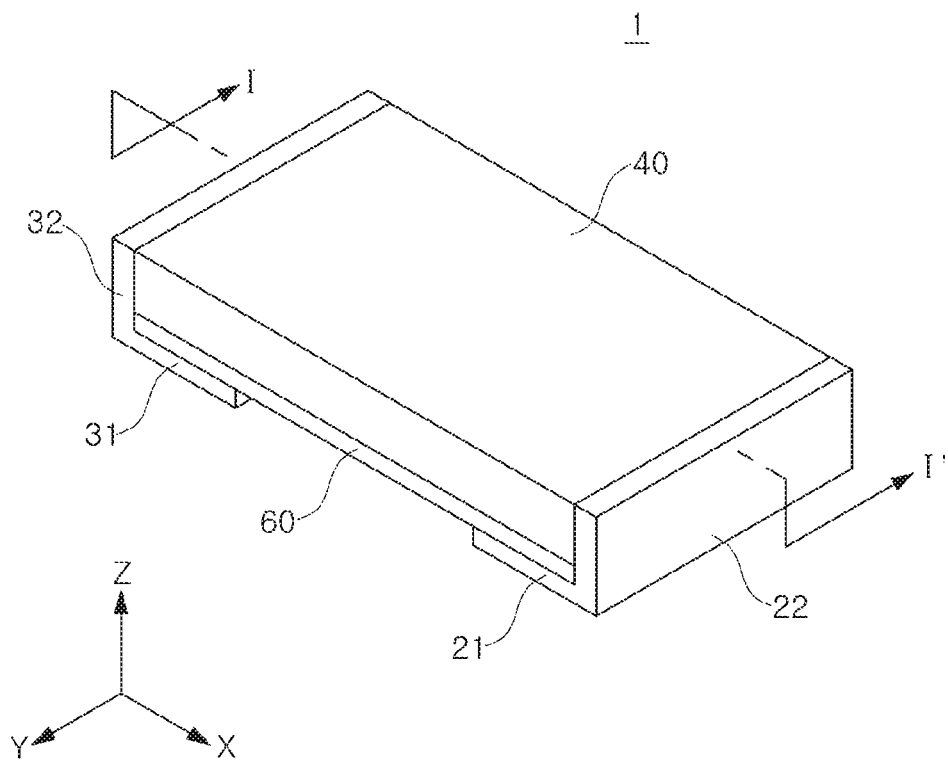
FIG. 1 is a perspective view schematically illustrating a tantalum capacitor applied to an embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be through and complete, and will fully convey the scope of the disclosure to those skilled in the art.

Accordingly, shapes and sizes of elements in the drawings may be exaggerated for clarity of description, and elements indicated by the same reference numeral are same elements in the drawings.

In addition, when the direction is defined to clearly describe embodiments of the present disclosure, the direction in which the tantalum wire is exposed in the tantalum body is set to a front direction, the direction opposite to the front direction is set to a rear direction, both surfaces of the tantalum body in a length direction are set to both end surfaces, both surfaces of the tantalum body in the thickness direction are set to upper and lower surfaces, and both surfaces of the tantalum body in the width direction are set to both side surfaces.

In addition, X, Y and Z illustrated in the drawings represent the length direction, the width direction and the thickness direction of the tantalum capacitor, the tantalum body and the encapsulation portion, respectively.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

Figure 2:
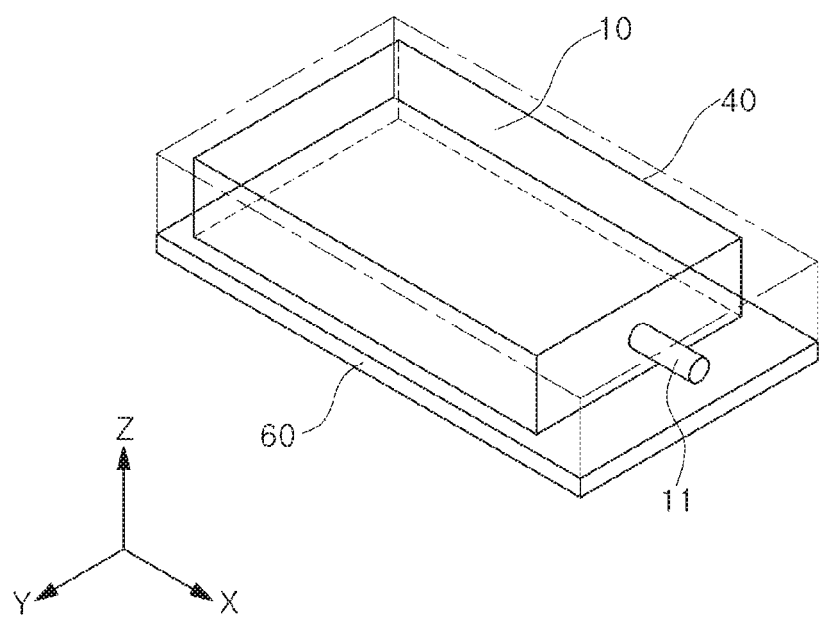
FIG. 2 is a transparent perspective view illustrating a tantalum body, a tantalum wire, a encapsulation portion, and an insulating member in FIG. 1.
Figure 3:
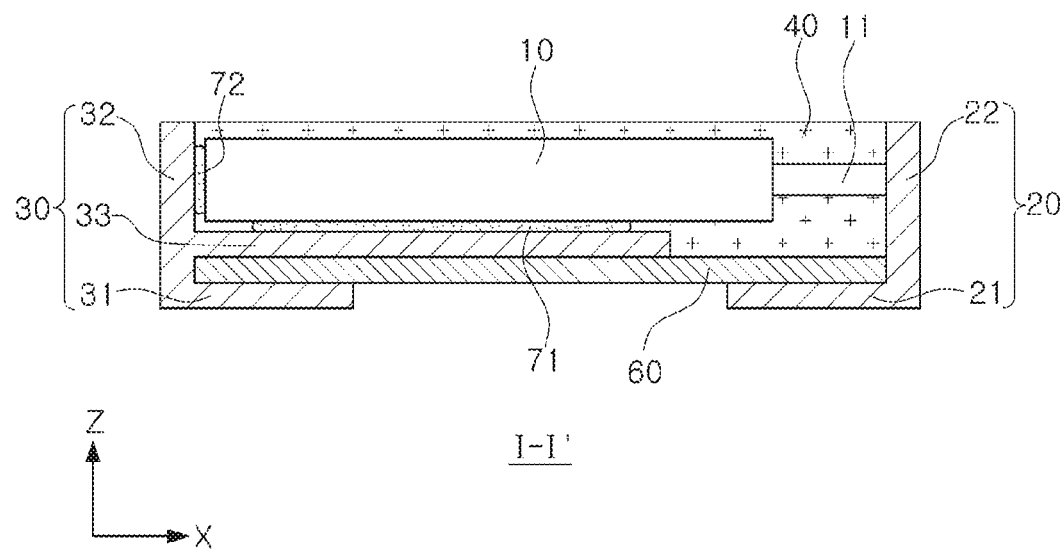
FIG. 3 is a cross-sectional view taken along line I-I' in FIG. 1.
Figure 4:
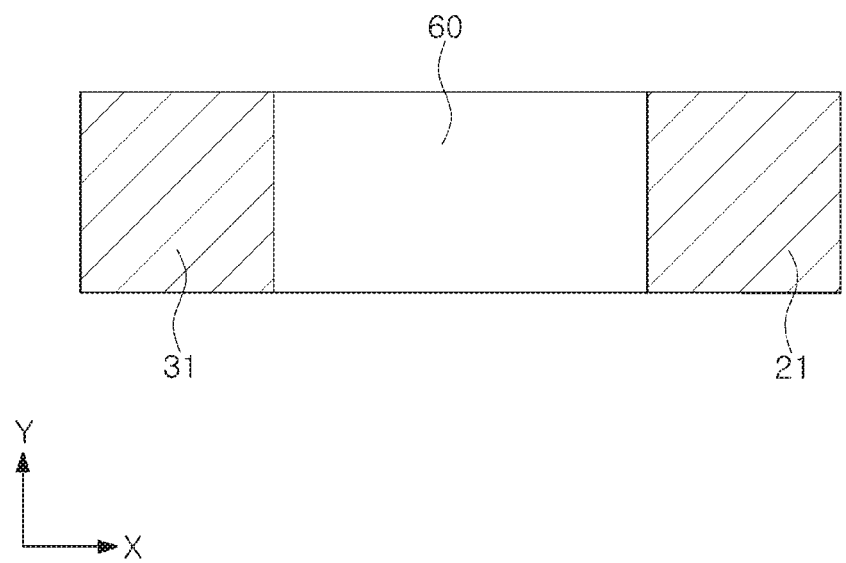
FIG. 4 is a bottom view of FIG. 1.

FIG. 1 is a perspective view schematically illustrating a tantalum capacitor applied to an embodiment of the present disclosure, FIG. 2 is a transparent perspective view illustrating a tantalum body, a tantalum wire, a encapsulation portion, and an insulating member in FIG. 1, FIG. 3 is a cross-sectional view taken along line I-I' in FIG. 1, and FIG. 4 is a bottom view of FIG. 1.

Referring to FIGS. 1 to 4, a tantalum capacitor 1 applied to the present embodiment includes a tantalum body 10, a encapsulation portion 40, an anode terminal 20, a thin plate electrode 33, and a cathode terminal 30.

The tantalum body 10 includes tantalum powder and can be molded by sintering.

In addition, as an example, the tantalum body 10 may be prepared by mixing and stirring tantalum powder and a binder at a predetermined ratio, compressing the mixed powder into a substantially rectangular parallelepiped shape, and sintering it under high temperature and high vibration.

The tantalum body 10 has a tantalum wire 11 exposed to one surface in the X direction.

In this case, the tantalum wire 11 may be mounted by inserting the mixture of the tantalum powder and the binder so as to be eccentric from the center before compressing the mixed powder.

In other words, the tantalum body 10 may be prepared by molding a tantalum element having a desired size by inserting the tantalum wire 11 into a tantalum powder mixed with a binder, and then by sintering the tantalum element under a high vacuum ($10^{-5}$ torr or less) atmosphere of about 1,000 to 2,000° C. for 30 minutes.

A encapsulation portion 40 encapsulates the tantalum body 10 in a state in which an end portion of the tantalum wire 11 is exposed through one end surface in an X direction.

The encapsulation portion 40 may be formed by transfer molding a resin such as an epoxy molding compound (EMC), or the like, to surround the tantalum body 10.

The encapsulation portion 40 may serve to protect the tantalum wire 11 and the tantalum body 10 from the outside.

An anode terminal 20 may include a conductive metal, and includes an anode mounting portion 21 and an anode connection portion 22.

The anode mounting portion 21 may be disposed on a lower side of the encapsulation portion 40 and may be used as a terminal for electrical connection with other electronic products.

The anode connection portion 22 is a portion that is bent in the Z direction at the end portion of the anode mounting portion 21 and extends to be disposed on one end surface of the encapsulation portion 40, and is connected to the exposed portion of the tantalum wire 11.

In this case, the anode connection portion 22 may be bonded to an end portion of the tantalum wire 11, for example, by electric welding, or the like. In particular, the electric welding may be performed using an electric spot welding method, but the present disclosure is not limited thereto.

A cathode terminal 30 may include a conductive metal, and includes a cathode mounting portion 31 and a cathode connection portion 32.

The cathode mounting portion 31 may be disposed to be spaced apart from the anode mounting portion 21 in the X direction on the lower surface side of the encapsulation portion 40, and may be used as a terminal for an electrical connection with other electronic products.

The cathode connection portion 32 is a portion that is bent in the Z direction at the end portion of the cathode mounting portion 31 and extended to be disposed on the other end surface of the encapsulation portion 40, and is connected to the thin plate electrode 33.

In this case, between the tantalum body 10 and the cathode connection portion 32 of the cathode terminal 30, the encapsulation portion 40 may not be formed to improve adhesion and electrical connectivity, a second conductive adhesive layer 72 may be disposed.

The second conductive adhesive layer 72 may include an epoxy-based thermosetting resin and a conductive metal powder.

The thin plate electrode 33 is disposed on the lower surface of the tantalum body 10, the lower surface thereof in the Z direction is exposed, and one end portion thereof in the X direction is exposed through the other end surface of the encapsulation portion 40 (a rear-side end surface on the drawing).

In one embodiment, the thin plate electrode 33 may be spaced apart from both side surfaces of the encapsulation portion 40 opposing each other and connecting the one end surface and the other end surface of the encapsulation portion 40 to each other, such that the thin plate electrode 33 is not exposed to an outside.

In addition, the thin film electrode 33 may be include a conductive metal, and may include, for example, manganese and a polymer, but the present disclosure is not limited thereto.

In addition, the thin plate electrode 33 may be formed integrally with the cathode terminal 30, and the present disclosure is not limited thereto.

As described above, when the tantalum body 10 is connected to the cathode terminal 30 using the thin plate electrode 33, a current path may decrease, and an area where the tantalum body 10 and the cathode terminal 30 are in contact with each other may be increased to reduce surface resistance, thereby reducing ESR of the tantalum capacitor 1.

In addition, in the conventional tantalum capacitor, since a solder formed between the tantalum body and the cathode terminal may be omitted, the size of the tantalum body may be increased by an area of the omitted solder to increase capacitance of the tantalum capacitor.

A first conductive adhesive layer 71 may be disposed between the lower surface of the tantalum body 10 and the thin plate electrode 33 to increase fixing force and electrical connectivity.

The first conductive adhesive layer 71 may include an epoxy-based thermosetting resin and a conductive metal powder.

The tantalum capacitor 1 of the present embodiment may further include an insulating member 60 disposed between the encapsulation portion 40 and the anode mounting portion 21 and between the thin plate electrode 33 and the cathode mounting portion 31.

The anode terminal 20 and the cathode terminal 30 may be disposed on the lower surface of the insulating member 60 to be spaced apart from each other in the X direction, and the insulating member 60 may be formed of an insulator such as FR4.

Accordingly, it serves to adjust the distance between the tantalum body 10 and the anode mounting portion 21 and the cathode mounting portion 31, which are used as external terminals, and may prevent contact between the thin plate electrode 33 and the anode terminal 20.

Figure 5:
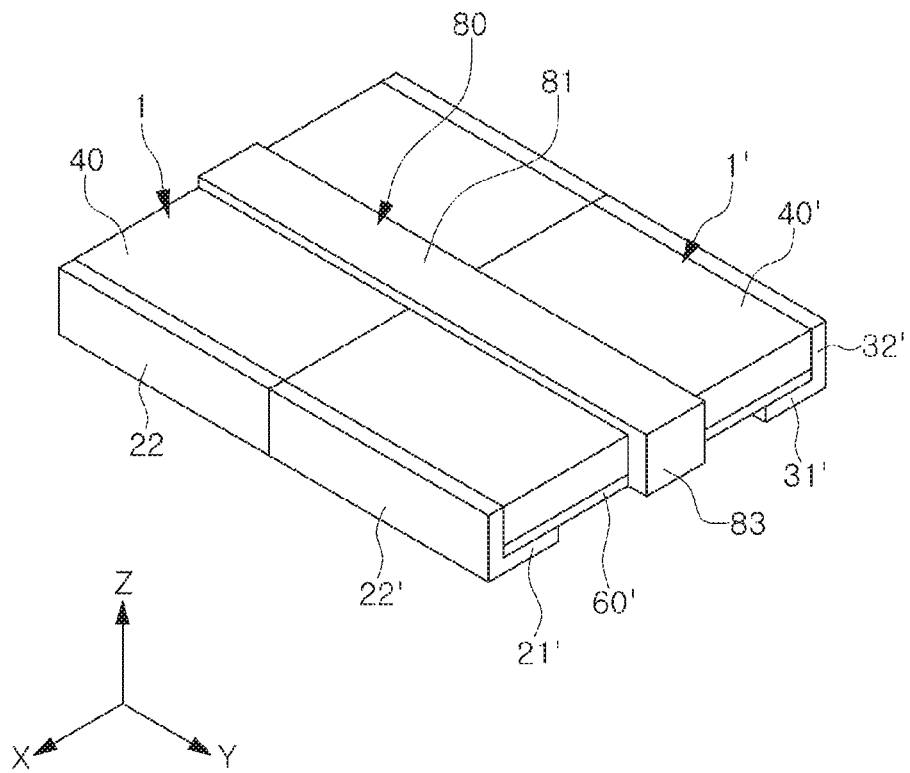
FIG. 5 is a perspective view schematically illustrating an electronic component according to an embodiment of the present disclosure.
Figure 6:
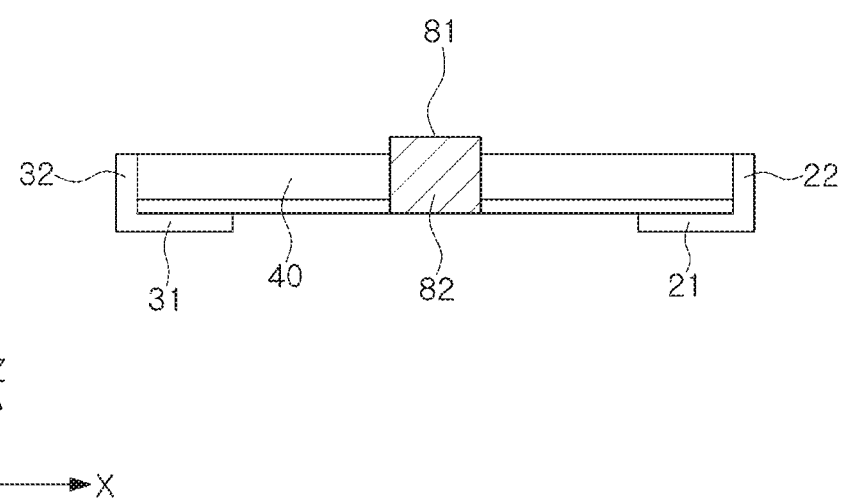
FIG. 6 is a side surface view of FIG. 5.

FIG. 5 is a perspective view schematically illustrating an electronic component according to an embodiment of the present disclosure, and FIG. 6 is a side surface view of FIG. 5.

Referring to FIGS. 5 and 6, an electronic component according to an embodiment of the present disclosure includes a capacitor array including a plurality of tantalum capacitors 1 and 1' arranged in a row and a fixing member 80.

In the present embodiment, although in the two tantalum capacitors 1 and 1', side surfaces thereof facing in the Y direction are in contact with each other, are illustrated and described as being arranged linearly, the present disclosure is not limited thereto, and the electronic component of the present embodiment may be configured by arranging three or more tantalum capacitors in a row in the Y direction.

A fixing member 80 supports the upper and both side surfaces of the capacitor array so that the first and second tantalum capacitors 1 and 1' are not separated.

That is, the fixing member 80 may have a form pressing the upper surface and both side surfaces of the capacitor array in a ring shape, and may maintain the form of a generally rectangular capacitor array while the first and second tantalum capacitors arranged linearly are not separated.

In this case, the fixing member 80 may include a material having a high melting point that does not melt even when the electronic component passes a reflow. For example, the fixing member 80 may include a metal.

In addition, the fixing member 80 may include a horizontal portion 81 disposed on the upper surface of the capacitor array in the Y direction, and first and second vertical portions 82 and 83 extending downwardly from both ends of the horizontal portion 81 downwardly in the Z direction, respectively, and disposed on both side surfaces of the capacitor array, respectively. In one embodiment, the horizontal portion 81 may extend in a direction substantially parallel with a stacking direction of the plurality of tantalum capacitors 1 and 1'. The horizontal portion 81 may extend on the upper surface of the capacitor array in the Y direction substantially perpendicular to a direction in which the tantalum wire 11 of each of the plurality of tantalum capacitors 1 and 1' extends. The first and second vertical portions 82 and 83 may extend in the Z direction to both corner edges of the capacitor array which are defined by the both side surfaces and a lower surface of the capacitor array.

That is, the horizontal portion 81 is disposed in contact with the upper surface of the encapsulation portion 40 of the first tantalum capacitor 1 and the encapsulation portion 40 of the second tantalum capacitor 1', the first vertical portion 82 is disposed to be in contact with one side surface of the encapsulation portion 40 of the first tantalum capacitor 1 in the Y direction, and the second vertical portion 83 is disposed in contact with one side surface of the encapsulation portion 40' of the second of the second tantalum capacitor 1' in the Y direction.

In this case, it is preferable in terms of structural stability that a length of the first vertical portion 82 in the Z direction is such that a lower end thereof extends to a lower end of the encapsulation portion 40.

In this case, the other side surface of the encapsulation portion 40 of the first tantalum capacitor 1 in the Y direction and the other side surface of the encapsulation portion 40' of the second tantalum capacitor 1' contact each other.

In addition, in the anode mounting portion 21 of the first tantalum capacitor 1 and the anode mounting portion 21' of the second tantalum capacitor 1', a surface facing each other in the Y direction may be in contact, and in the anode connection portion 22 of the first tantalum capacitor 1 and the anode connection portion 22' of the second tantalum capacitor 1', a surface facing each other in the Y direction may be in contact.

In addition, the cathode mounting portion 31 of the first tantalum capacitor 1 and the cathode mounting portion 31' of the second tantalum capacitor 1' may be in contact with the surfaces facing each other, and the cathode mounting portion 32 of the first tantalum capacitor first tantalum capacitor 1 and the cathode mounting portion 32' of the second tantalum capacitor 1' may be in contact with the surfaces facing each other.

Among the tantalum capacitors, there is a frameless structure in which a terminal is extracted externally without an internal lead frame or a frame to connect a tantalum material and an electrode.

In the case of the tantalum capacitor having the conventional frameless structure, since a cathode terminal is located on the side surface of the product, due to reasons such as having to secure a welding distance in which solder is formed between the tantalum body and the cathode terminal, or the like, an internal volume ratio of the tantalum body may be reduced and capacitance may be lowered.

The tantalum capacitor applied to the electronic component of the present embodiment has a frameless structure, and a plurality of tantalum capacitors are arranged in a row in the Y direction by using a point that there is no or very little bending on the side surface of the tantalum capacitor, and then connected to each other by the fixing member and fixed.

The electronic component according to the present embodiment configured as described above, after designing and preparing each tantalum capacitor in a 1/n size of a product size desired by a customer, and then connecting a plurality of tantalum capacitors in parallel, and thus the ESR of the electronic component to 1/n, while realizing the capacity of the electronic component by n times.

Meanwhile, a structure of the capacitor array of the preset disclosure is difficult to be applied to a tantalum capacitor having a general structure having a curved side surface of a conventional product and having a lower electrode.

In this case, the capacitor array may have an area in contact with each other on a corresponding surface of an encapsulation portion of an adjacent tantalum capacitor that may be 90% or more of an entire surface.

If the area in contact with each other on the corresponding surface of the encapsulation portion of the adjacent tantalum capacitor is less than 90% of the entire surface, excitation may occur at interfaces of the adjacent tantalum capacitors, and mechanical reliability as an electronic component may rapidly decrease.

As set forth above, according to an embodiment of the present disclosure, a plurality of tantalum capacitors may be parallel-modulated into a physical structure to increase the total capacity of the electronic component and lower the ESR without significantly increasing the total size of the product.

However, various and advantageous advantages and effects of the present disclosure are not limited to the above description, and will be more readily understood in the process of describing specific embodiments of the present disclosure.

While exemplary embodiments have been shown and described above, it will be apparent to those skilled in the art that modifications and variations could be made without departing from the spirit and scope of the present disclosure as defined by the appended claims.

What is claimed is:

1. An electronic component, comprising:
    a capacitor array including a plurality of tantalum capacitors arranged linearly; and
    a fixing member supporting a first surface and both side surfaces of the capacitor array so that the plurality of tantalum capacitors are not separated,
    wherein an area through which adjacent tantalum capacitors in the capacitor array are in contact with each other is 90% or more of an entire area of a corresponding surface of the adjacent tantalum capacitors, and
    wherein the fixing member is electrically isolated from at least one of the plurality of tantalum capacitors.

2. The electronic component of claim 1, wherein the fixing member comprises a horizontal portion extending on the first surface of the capacitor array, and first and second vertical portions respectively extending from both ends of the horizontal portion to be disposed on both side surfaces of the capacitor array, respectively.

3. The electronic component of claim 1, wherein the fixing member includes a metal.

4. The electronic component of claim 1, wherein each of the plurality of tantalum capacitors comprises:
    a tantalum body including a tantalum powder, and having a tantalum wire exposed from a first end surface thereof;
    an encapsulation portion encapsulating the tantalum body such that an end portion of the tantalum wire is exposed to an outside of the encapsulation portion;
    an anode terminal including an anode mounting portion disposed on a first surface of the encapsulation portion, and an anode connection portion extending from the anode mounting portion onto a first end surface of the encapsulation portion, the anode connection portion being connected to the tantalum wire;
    a thin plate electrode disposed to be connected to a first surface of the tantalum body facing the first surface of the encapsulation portion, and exposed through a second end surface of the encapsulation portion opposing the first end surface of the encapsulation portion; and
    a cathode terminal including a cathode mounting portion disposed to be spaced apart from the anode mounting portion on the first surface of the encapsulation portion, and a cathode connection portion extending from the cathode mounting portion onto the second end surface of the encapsulation portion, the cathode connection portion being connected to the thin plate electrode.

5. The electronic component of claim 4, further comprising an insulating member disposed between the encapsulation portion and the anode mounting portion, and disposed between the thin plate electrode and the cathode mounting portion.

6. The electronic component of claim 4, further comprising a first conductive adhesive layer disposed between the tantalum body and the thin plate electrode.

7. The electronic component of claim 6, wherein the first conductive adhesive layer includes an epoxy-based thermosetting resin and a conductive metal powder.

8. The electronic component of claim 4, further comprising a second conductive adhesive layer disposed between the tantalum body and the cathode connection portion of the cathode terminal.

9. The electronic component of claim 8, wherein the second conductive adhesive layer includes an epoxy-based thermosetting resin and a conductive metal powder.

10. The electronic component of claim 4, wherein the thin plate electrode is spaced apart from both side surfaces of the encapsulation portion opposing each other and connecting the first and second end surfaces of the encapsulation portion to each other.

11. An electronic component, comprising:
    a capacitor array including a plurality of tantalum capacitors arranged linearly; and
    a fixing member disposed on a first surface of the capacitor array, opposite a mounting surface, and extending in a first direction substantially parallel with a stacking direction of the plurality of tantalum capacitors, wherein the fixing member further extends onto at least portions of both side surfaces of the capacitor array, respectively.

12. The electronic component of claim 11, wherein an area through which adjacent tantalum capacitors in the capacitor array are in contact with each other is 90% or more of an entire area of a corresponding surface of the adjacent tantalum capacitors.

13. The electronic component of claim 11, wherein the fixing member extends to both corner edges of the capacitor array which are defined by the both side surfaces and a second surface of the capacitor array, the second surface opposing the first surface of the capacitor array.

14. The electronic component of claim 11, wherein each of the plurality of tantalum capacitors includes a tantalum body and a tantalum wire exposed from a first end surface of the tantalum body, wherein the fixing member extends on the first surface of the capacitor array in the first direction substantially perpendicular to a direction in which the tantalum wire of each of the plurality of tantalum capacitors extends.

\* \* \* \* \*